(12) United States Patent
Tanaka et al.

(10) Patent No.: US 10,166,923 B2
(45) Date of Patent: Jan. 1, 2019

(54) IMAGE GENERATION DEVICE AND IMAGE GENERATION METHOD

(71) Applicant: DENSO CORPORATION, Kariya, Aichi-pref. (JP)

(72) Inventors: Hitoshi Tanaka, Kariya (JP); Youji Morishita, Kariya (JP); Muneaki Matsumoto, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 86 days.

(21) Appl. No.: 15/517,139

(22) PCT Filed: Sep. 24, 2015

(86) PCT No.: PCT/JP2015/004854
§ 371 (c)(1),
(2) Date: Apr. 5, 2017

(87) PCT Pub. No.: WO2016/056196
PCT Pub. Date: Apr. 14, 2016

(65) Prior Publication Data
US 2017/0297491 A1 Oct. 19, 2017

(30) Foreign Application Priority Data
Oct. 9, 2014 (JP) ................................ 2014-208430

(51) Int. Cl.
*B60R 1/00* (2006.01)
*G06T 11/60* (2006.01)
(Continued)

(52) U.S. Cl.
CPC ............... *B60R 1/002* (2013.01); *B60R 1/00* (2013.01); *G06T 3/4038* (2013.01); *G06T 11/60* (2013.01);
(Continued)

(58) Field of Classification Search
CPC ..... B60R 1/00; B60R 1/002; B60R 2300/102; B60R 2300/105; B60R 2300/303;
(Continued)

(56) References Cited

U.S. PATENT DOCUMENTS

2008/0170122 A1 7/2008 Hongo et al.
2008/0181488 A1* 7/2008 Ishii ......................... B60R 1/00
382/154

(Continued)

FOREIGN PATENT DOCUMENTS

JP 2013-222302 A 4/2012

*Primary Examiner* — Tung T Vo
(74) *Attorney, Agent, or Firm* — Knobbe, Martens, Olson & Bear, LLP

(57) ABSTRACT

An image generation device for referencing a correspondence relationship and generating a line-of-sight-converted image from a captured image of an in-vehicle camera mounted to a vehicle is provided. The image generation device includes a first region updating unit that, upon sensing deviation of at least one of the mounting position and the mounting angle of the in-vehicle camera and calculating a new mounting position and mounting angle, updates a correspondence relationship of a predetermined first region in the line-of-sight-converted image in accordance with the new mounting position and mounting angle, and a second region updating unit that, upon satisfaction of a predetermined updating condition after updating the correspondence relationship of the first region, updates the correspondence relationship for a second region in the line-of-sight-converted image in accordance with the new mounting position and mounting angle.

7 Claims, 11 Drawing Sheets

(51) Int. Cl.
   *H04N 5/247*   (2006.01)
   *G06T 3/40*    (2006.01)
   *G08G 1/16*    (2006.01)
   *H04N 5/225*   (2006.01)
   *H04N 5/232*   (2006.01)
   *H04N 7/18*    (2006.01)

(52) U.S. Cl.
   CPC ............ *G08G 1/166* (2013.01); *H04N 5/2258* (2013.01); *H04N 5/23293* (2013.01); *H04N 5/247* (2013.01); *H04N 7/181* (2013.01); *B60R 2300/102* (2013.01); *B60R 2300/105* (2013.01); *B60R 2300/303* (2013.01); *B60R 2300/60* (2013.01); *B60R 2300/607* (2013.01)

(58) Field of Classification Search
   CPC .......... B60R 2300/607; B60R 2300/60; H04N 5/247; H04N 5/2258; H04N 5/23293; H04N 7/181; G06T 3/4038; G06T 11/60; G08G 1/166
   USPC ......................................................... 348/148
   See application file for complete search history.

(56) References Cited

U.S. PATENT DOCUMENTS

| | | | | |
|---|---|---|---|---|
| 2010/0215218 | A1* | 8/2010 | Takahashi | ................. G06T 3/00 382/104 |
| 2011/0115922 | A1  | 5/2011 | Shimizu | |
| 2015/0350607 | A1* | 12/2015 | Kim | ...................... H04N 7/181 348/148 |
| 2016/0182823 | A1* | 6/2016 | Murasumi | ................. B60R 1/00 348/38 |
| 2017/0134661 | A1* | 5/2017 | Chietein | ................... B60R 1/00 |

\* cited by examiner

IMAGE GENERATION DEVICE AND IMAGE GENERATION METHOD

CROSS-REFERENCE TO RELATED APPLICATION

This application is based on Japanese Patent Application No. 2014-208430 filed on Oct. 9, 2014, disclosure of which is incorporated herein by reference.

TECHNICAL FIELD

The present disclosure relates to a technology applied to a vehicle including an in-vehicle camera to perform line-of-sight conversion on an image obtained by imaging the surroundings of the vehicle and to display the resulting image on an in-vehicle monitor.

BACKGROUND ART

It has widely been performed to convert an image captured with an in-vehicle camera in such a manner as if the image were captured in a virtual line of sight (e.g., a line of sight looking down on a vehicle from immediately above the vehicle) different from the line of sight of the in-vehicle camera and display the resulting line-of-sight-converted image on an in-vehicle monitor. This line-of-sight-converted image is generated as follows. First, when the direction of the line of sight when the image is actually captured and the direction of the virtual line of sight are determined, pixels in the actually captured image and pixels in the line-of-sight-converted image correspond to each other on a one-to-one basis. Thus, the image data (such as luminance or chroma) of the pixel in the captured image corresponding to each single pixel in the line-of-sight-converted image is set. Accordingly, the line-of-sight-converted image can be generated based on the captured image.

When it is assumed herein that, e.g., the size of a line-of-sight-converted image is 800 pixels×500 pixels, the number of the pixels is as large as 400,000. It is difficult to display a line-of-sight-converted image in a imaging period (e.g., 30 Hz) by calculating the corresponding pixel in the captured image for each of the 400,000 pixels. Accordingly, a method which preliminarily produces a conversion table showing a correspondence relationship specifying which pixel in the captured image is to be allocated to which pixel in the line-of-sight-converted image has been used commonly. When the preliminarily produced conversion table is stored to be readable, the corresponding pixels in the captured image can be specified by merely referencing the conversion table, allowing prompt application of the line-of-sight-conversion to the captured image.

However, when the mounting position or mounting angle of the in-vehicle camera with reference to a road surface changes, the stored conversion table can no longer be used. For example, when a vehicle is running on a curved road, is accelerated or decelerated, or has a heavy object mounted therein, the vehicle is inclined so that the mounting position or mounting angle of the in-vehicle camera with reference to a road surface changes. The mounting position or mounting angle of the in-vehicle camera relative to the vehicle may also change due to the loosening of the fastened portion of the in-vehicle camera or the like. After the mounting position or mounting angle of the in-vehicle camera with reference to a road surface thus changes, when the stored conversion table is used to perform the line-of-sight conversion, the resulting line-of-sight-converted image looks artificial.

Accordingly, a technology has been proposed to update the conversion table in accordance with a new mounting position and a new mounting angle when the mounting position and mounting angle of the camera with reference to a road surface change (Patent Literature 1).

PRIOR ART LITERATURE

Patent Literature

Patent Literature 1: JP2013-222302A

SUMMARY OF INVENTION

However, the conversion table has a large amount of data and the updating thereof takes a long time. Consequently, until the updating of the conversion table is completed, an artificially looking line-of-sight-converted image may be generated.

An object of the present disclosure is to provide a technology which allows for, even when the updating of the conversion table is necessary, prompt restoration from a state where an artificially looking line-of-sight-converted image is generated.

An image generation device in an example of the present disclosure is applied to a vehicle mounted with an in-vehicle camera to line-of-sight-convert an image captured by the in-vehicle camera to generate a line-of-sight-converted image which is an image different in photographing direction from the image captured by the in-vehicle camera, and the image generation device comprises: a correspondence relationship storage unit that stores a correspondence relationship which is determined in accordance with a mounting position and a mounting angle of the in-vehicle camera with reference to a road surface and which associates a pixel position on the line-of-sight-converted image with a pixel position on the captured image; an image generation unit that references the correspondence relationship to generate the line-of-sight-converted image from the captured image; a deviation sensing unit that senses deviation of at least one of the mounting position and the mounting angle of the in-vehicle camera; a mounted state calculation unit that, upon sensing of the deviation, calculates a mew mounting position and a new mounting angle of which the deviation is not sensed; a first region updating unit that, upon calculating the new mounting position and the new mounting angle, updates the correspondence relationship associated with a first region in accordance with the new mounting position and the new mounting angle, wherein the first region is a predetermined image region that is set in the line-of-sight-converted image; and a second region updating unit that, upon satisfaction of a predetermined updating condition after updating the correspondence relationship associated with the first region, updates the correspondence relationship associated with a second region in the line-of-sight-converted image in accordance with the new mounting position and the new mounting angle, wherein the second region is other than the first region.

An image generation method in an example of the present disclosure is applied to a vehicle mounted with an in-vehicle camera to line-of-sight-convert an image captured by the in-vehicle camera to generate a line-of-sight-converted image which is an image different in photographing direction from the image captured by the in-vehicle camera, and the image generation method comprises: generating the line-of-sight-converted image thorough referencing a correspondence relationship which is determined in accordance with a mounting position and a mounting angle of the in-vehicle camera with reference to a road surface and which associates a pixel position on the line-of-sight-converted image with a pixel position on the captured image; sensing deviation of at least one of the mounting position and the mounting angle of the in-vehicle camera; upon sensing of the deviation, calculating a new mounting position and a new mounting angle the deviation of which is not sensed; upon calculating the new mounting position and the new mounting angle, updating the correspondence relationship associated with a first region in accordance with the new mounting position and the new mounting angle, wherein the first region is a predetermined image region that is set in the line-of-sight-converted image; and upon satisfaction of a predetermined updating condition after updating the correspondence relationship associated with the first region, updating the correspondence relationship associated with a second region in the line-of-sight-converted image in accordance with the new mounting position and the new mounting angle, wherein the second region is other than the first region.

With the image generation device and image generation method described above, even when the in-vehicle camera undergoes deviation, it is possible to promptly update the correspondence relationship for the first region in the line-of-sight-converted image. Accordingly, by setting an appropriate region (e.g., a noticeable region or an important region) in the line-of-sight-converted image as the first region, when the in-vehicle camera undergoes deviation, it is possible to allow for prompt restoration from the state where an artificially looking line-of-sight-converted image is displayed.

BRIEF DESCRIPTION OF DRAWINGS

The above and other objects, features and advantages of the present disclosure will become more apparent from the following detailed description made with reference to the accompanying drawings. In the accompanying drawings.

EMBODIMENT FOR CARRYING OUT THE INVENTION

The following will describe an embodiment of an image generation device.

A-1. Device Configuration in Present Embodiment

Figure 1A:
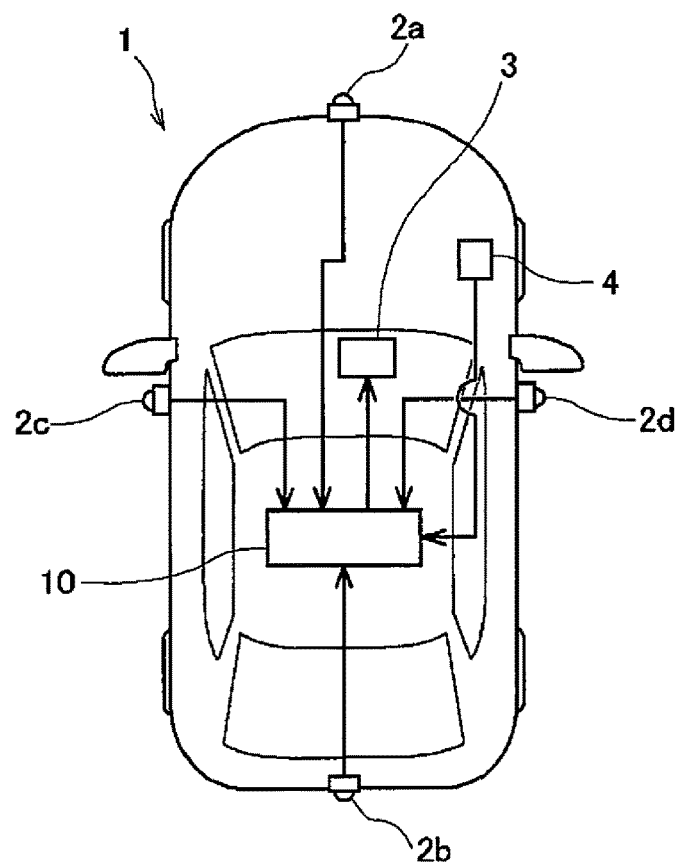
FIG. 1A is a schematic illustration diagram of a vehicle in which an image generation device in the present embodiment is mounted.

FIG. 1A shows a schematic structure of a vehicle 1 in which an image generation device 10 is mounted. As shown in the drawing, the vehicle 1 includes, in addition to the image generation device 10, in-vehicle cameras 2a to 2d provided respectively on the front, rear, left, and right portions of the vehicle 1, an in-vehicle monitor 3 which is visually recognizable from a driver's seat, and a vehicle speed sensor 4. The in-vehicle camera 2a acquires a front-view captured image showing a view ahead of the vehicle 1. Likewise, the in-vehicle camera 2b acquires a rear-view captured image showing a view behind the vehicle 1, the in-vehicle camera 2c acquires a left-view captured image showing a view on the left side of the vehicle 1, and the in-vehicle camera 2d acquires a right-view captured image showing a view on the right side of the vehicle 1.

These captured images acquired by the in-vehicle cameras 2a to 2d are supplied to the image generation device 10 and are subjected to predetermined image processing and then output from the image generation device 10 to the in-vehicle monitor 3. As described above, the captured image obtained from the in-vehicle camera 2a is the image resulting from the imaging of the view ahead of the vehicle 1. The image generation device 10 converts the captured image to an image which appears as if captured in such a manner that a view ahead of the vehicle 1 is looked down on from above. A process of converting the images captured by the in-vehicle cameras 2a to 2d to images which appear as if captured in a look-down direction is hereinafter referred to as "bird's-eye conversion". Also, an image resulting from the bird's-eye conversion is referred to as a "bird's-eye image".

Note that, in the present embodiment, a description will be given on the assumption that the images captured by the in-vehicle cameras 2a to 2d are converted (bird's-eye-converted) to images which appear as if captured in the look-down direction. However, the photographing direction after the conversion need not necessarily be the look-down direction and may be any photographing direction as long as the photographing direction after the conversion is different from the actual photographing direction. The process of converting the images captured by the in-vehicle cameras to images which appear as if captured in directions different from the actual photographing directions may also be referred to as "line-of-sight conversion". Therefore, the bird's-eye conversion can be considered to be an embodiment of the line-of-sight conversion.

Figure 1B:
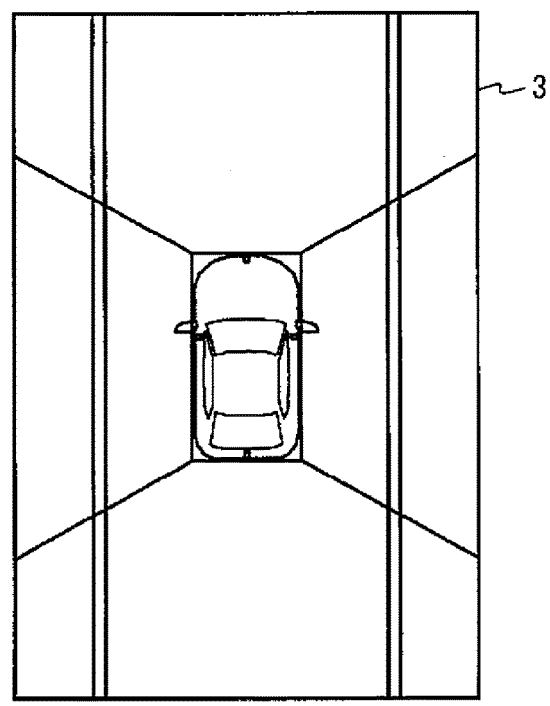
FIG. 1B is a view showing a bird's-eye image.

Since the images captured on the front, rear, left, and right sides of the vehicle 1 can be obtained from the in-vehicle cameras 2a to 2d, when these captured images are subjected to the bird's-eye conversion, the bird's-eye images of views on the front, rear, left, and right sides of the vehicle 1 can be obtained. When the angles of view of the in-vehicle cameras 2a to 2d are set sufficiently large, it is possible t, by combining the bird's-eye images obtained from the in-vehicle cameras 2a to 2d, display the surroundings of the vehicle 1 in a top-down perspective on the in-vehicle monitor 3, as shown in FIG. 1B.

Figure 2:
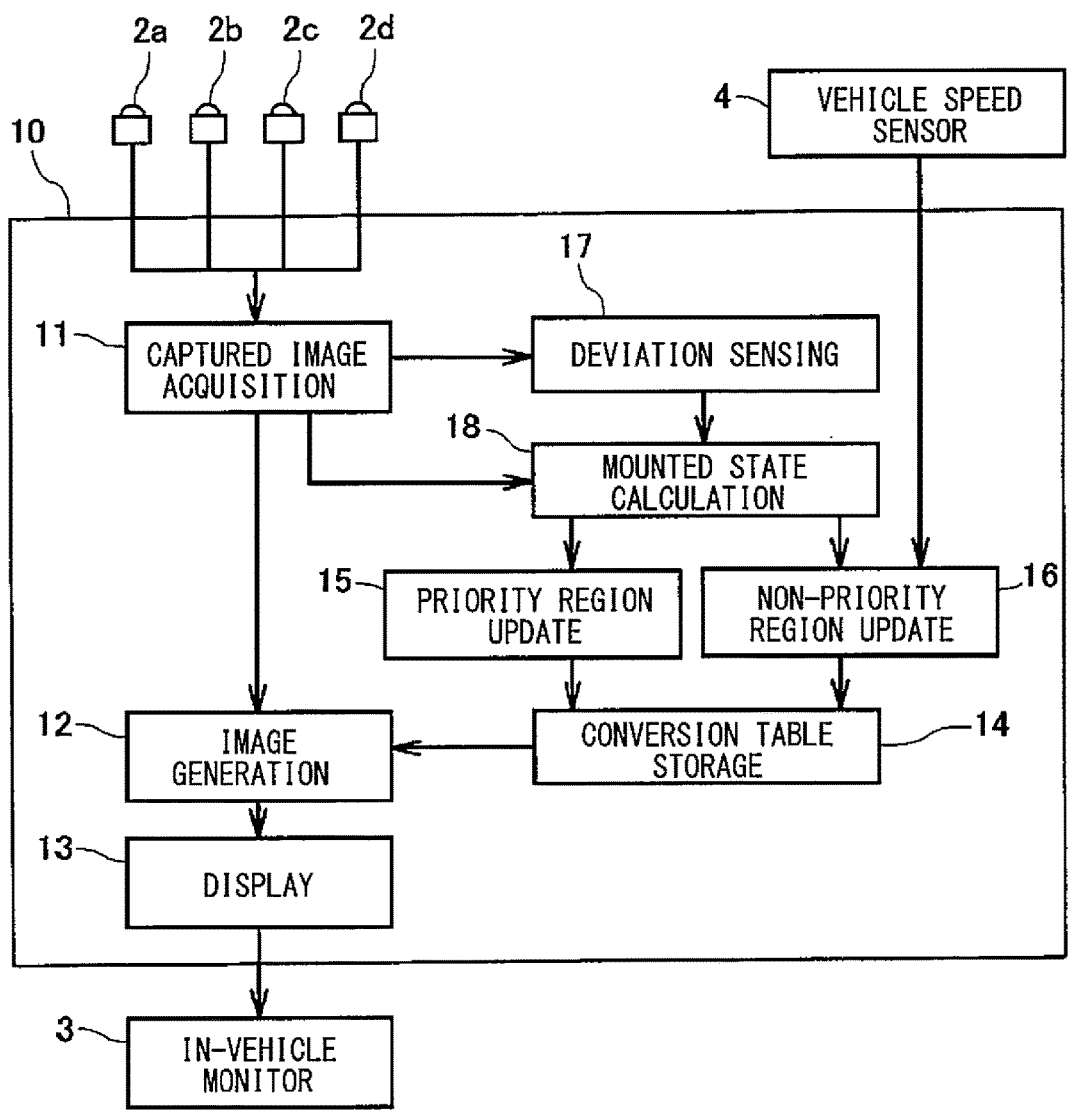
FIG. 2 is a block diagram showing an inner configuration of the image generation device.

FIG. 2 shows an inner structure of the image generation device 10 which displays a bird's-eye image on the in-vehicle monitor 3. As shown in the drawing, the image generation device 10 includes a captured image acquisition unit 11, an image generation unit 12, a display unit 13, and a conversion table storage unit 14. Among them, the captured image acquisition unit 11 acquires the image captured by each of the in-vehicle cameras 2a to 2d in a given photographing period (e.g., 30 Hz) and outputs the acquired image to the image generation unit 12. Note that the conversion table storage unit 14 corresponds to a correspondence relationship storage unit.

The image generation unit 12 performs the bird's-eye conversion on the captured image, while referencing the conversion table stored in the conversion table storage unit 14, to generate a bird's-eye image. As described above, the bird's-eye conversion is the process of converting the image captured by each of the in-vehicle cameras 2a to 2d to an image (bird's-eye image) which appears as if captured in a direction in which the vehicle 1 is looked down on from above. Using the case where the in-vehicle camera 2a images a view ahead of the vehicle 1 as an example, the following will describe a method in which the image generation unit 12 references the conversion table to generate the bird's-eye image from the captured image.

Figure 3:
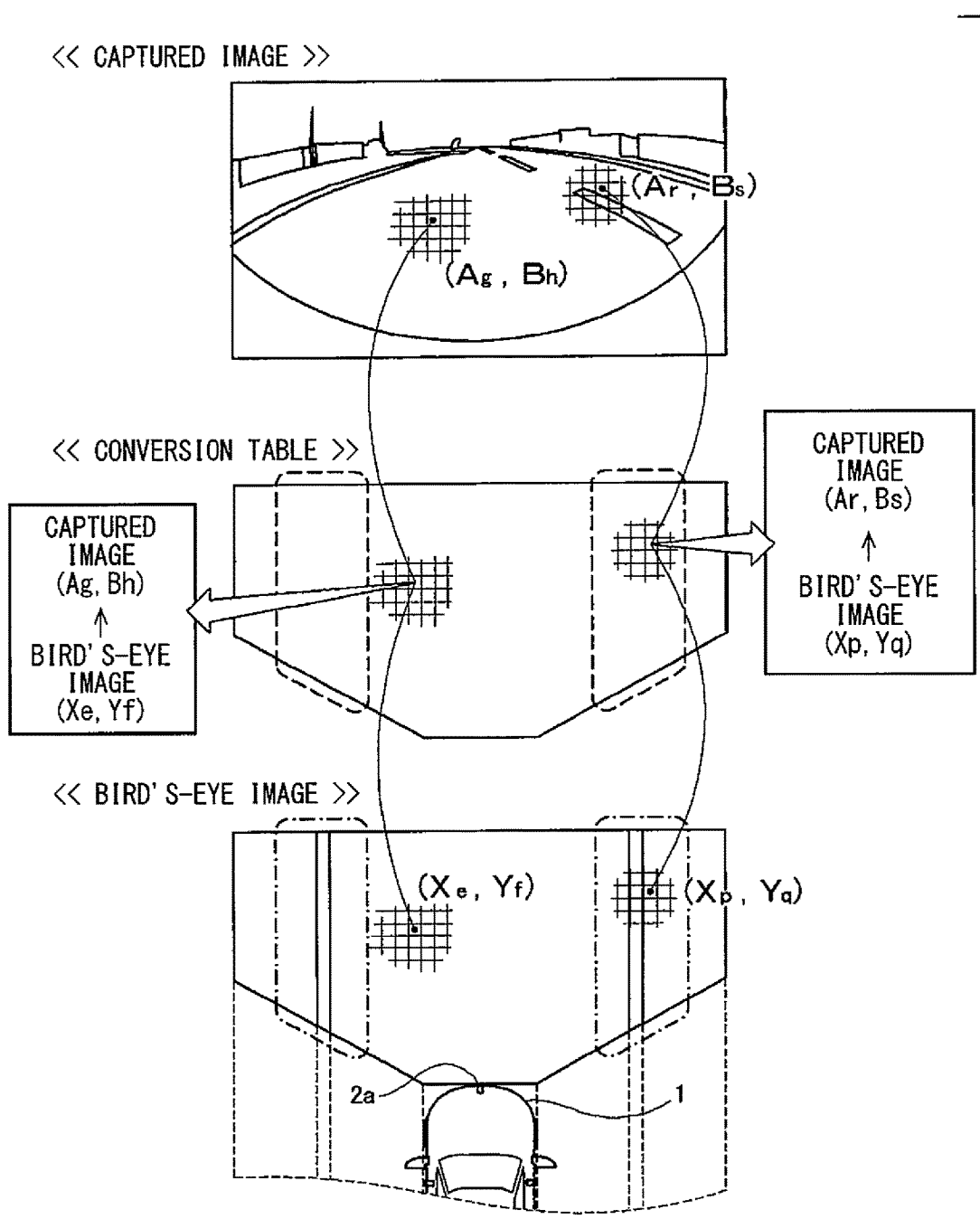
FIG. 3 is an illustration diagram showing how the image generation device generates a bird's-eye image from a captured image using a conversion table.

FIG. 3 shows how the image generation unit 12 references the conversion table when converting the captured image to the bird's-eye image. FIG. 3 shows the image of the view ahead of the vehicle 1 which is captured by the in-vehicle camera 2a and also shows the bird's-eye image obtained by converting the captured image. Note that, in FIG. 3, for the sake of easier understanding, not only the bird's-eye image, but also the position of the vehicle 1 is also shown. FIG. 3 also shows the conversion table used to convert the captured image to the bird's-eye image.

As shown in the drawing, the pixels in the captured image corresponding to the pixels in the bird's-eye image are set in the conversion table. For example, for the pixel at the coordinate (Xe, Yf) in the bird's-eye image, the pixel at the coordinate (Ag, Bh) in the captured image is set. Also, for the pixel at the coordinate (Xp, Yq) in the bird's-eye image, the pixel at the coordinate (Ar, Bs) in the captured image is set. Thus, in the conversion table, the correspondence relationships between the plurality of (or all the) pixels in the bird's-eye image and the pixels in the captured image are described. Accordingly, when the image data (e.g., luminance or chroma) of the corresponding pixels in the captured image is reflected on all the pixels in the bird's-eye image, a bird's-eye image resulting from line-of-sight conversion of the captured image can be generated.

Since a method of producing the conversion table is well known, a detailed description thereof is omitted, but the conversion table is produced roughly based on the following principle.

First, when a road surface is imaged with the in-vehicle camera 2a, any one point on the road surface located in the captured region inevitably corresponds to any one point in the captured image. Since the bird's-eye image is the converted image which appears as if captured in a line of sight looking down the road surface from above, it follows that any one point in the bird's-eye image inevitably corresponds to any one point in the captured image. Accordingly, as long as the relationship between the mounting position and mounting angle of the in-vehicle camera 2a with reference to the road surface is constant, the correspondence relationship between the point in the bird's-eye image and the point in the captured image is uniquely determined. By subsequently calculating the correspondence relationship for each one of the pixels in the bird's-eye image, the conversion table is produced. In the conversion table storage unit 14 shown in FIG. 2, the conversion table describing the correspondence relationship calculated in the state where the mounting position and mounting angle of the in-vehicle camera 2a are fixed relative to the vehicle 1 is stored.

In the conversion table storage unit 14, not only the conversion table for the in-vehicle camera 2a, but also respective conversion tables for the in-vehicle cameras 2b, 2c, and 2d are stored. The image generation unit 12 also generates the bird's-eye images for the images captured by the in-vehicle cameras 2b to 2d by referencing the respective conversion tables for the in-vehicle cameras 2b to 2d.

The display unit 13 receives the bird's-eye images of the views on the front, rear, left, and right sides of the vehicle 1 from the image generation unit 12 and outputs the received bird's-eye images to the in-vehicle monitor 3. As a result, on the in-vehicle monitor 3, as shown in FIG. 1B, the bird's-eye images are displayed in such a state as if the surroundings of the vehicle 1 were looked down on from above.

As shown in FIG. 2, the image generation device 10 in the present embodiment also includes a deviation sensing unit 15, a mounted state calculation unit 16, a priority region updating unit 17, and a non-priority region updating unit 18 in addition to the captured image acquisition unit 11, the image generation unit 12, the display unit 13, and the conversion table storage unit 14 each described above. Note that the priority region updating unit 17 corresponds to an example of a first region updating unit and the non-priority region updating unit 18 corresponds to an example of a second region updating unit.

The eight "units" included in the image generation device 10 are concepts obtained by categorizing the inner portion of the image generation device 10 from a functional viewpoint, and it is not intended to show that the image generation device 10 is physically partitioned into eight units. Accordingly, these "units" can also be implemented by a computer program executed by a CPU, by an electronic circuit including an LSI and a memory, or by a combination thereof.

Among them, the deviation sensing unit 15 senses the deviation of the mounting position or mounting angle of any of the in-vehicle cameras 2a to 2d mounted in the vehicle 1 based on the images captured by the in-vehicle cameras 2a to 2d and acquired from the captured image acquisition unit 11. As described above, since the conversion table is set on the assumption that the in-vehicle cameras 2a to 2d are fixed relative to the vehicle 1, the conversion table should be updated for the vehicle camera that has undergone deviation relative to the vehicle 1.

Accordingly, when any of the in-vehicle cameras 2a to 2d that has undergone deviation is sensed by the deviation sensing unit 15, the mounted state calculation unit 16 calculates the mounting position and mounting angle of that one of the in-vehicle-cameras 2a to 2d relative to the vehicle 1. Then, based on the calculated mounting position and mounting angle, the conversion table for the in-vehicle camera that has undergone deviation is updated.

Upon updating the conversion table herein, the image generation device 10 in the present embodiment does not uniformly update the whole conversion table, but preferentially updates a predetermined region. That is, in the conversion table in the present embodiment, a priority region and a non-priority region are set and, when the conversion table is updated, the priority region is preferentially updated. The priority region in the conversion table mentioned herein is a region to be referenced to generate a predetermined range in the bird's-eye image. In the bird's-eye image shown by way of example in FIG. 3, the ranges enclosed by the dot-dash lines including the white lines correspond to the predetermined range in the bird's-eye image. Accordingly, the regions enclosed using the broken lines in the conversion table shown by way of example in FIG. 3 correspond to the priority region in the conversion table. Also, the portion of the conversion table other than the priority region serves as the non-priority region.

Note that the above mentioned predetermined range in the bird's-eye image corresponding to the priority region corresponds to an example of a first region and the other range in the bird's-eye image corresponds to an example of a second region.

In correspondence to the provision of the priority region and the non-priority region in the conversion table, the image generation device 10 in the present embodiment is provided with the priority region updating unit 17 and the non-priority region updating unit 18. When any of the in-vehicle cameras 2a to 2d undergoes deviation and the mounted state calculation unit 16 calculates the mounting position and mounting angle of the in-vehicle camera, the priority region updating unit 17 immediately updates the priority region in the conversion table. Then, the non-priority region updating unit 18 recognizes the satisfaction of a predetermined updating condition and then updates the non-priority region in the conversion table.

Even when any of the in-vehicle cameras 2a to 2d undergoes deviation during the running of the vehicle 1 and the bird's-eye image displayed on the in-vehicle monitor 3 undergoes abnormality (such as when, e.g., the white lines are displayed in a misaligned or multiply bent configuration), it is possible to promptly restore the bird's-eye image to a normal state, while suppressing the influence of the abnormality. The following will describe the bird's-eye image generation process performed in the image generation device 10 so as to allow for such restoration in detail.

Figure 4:
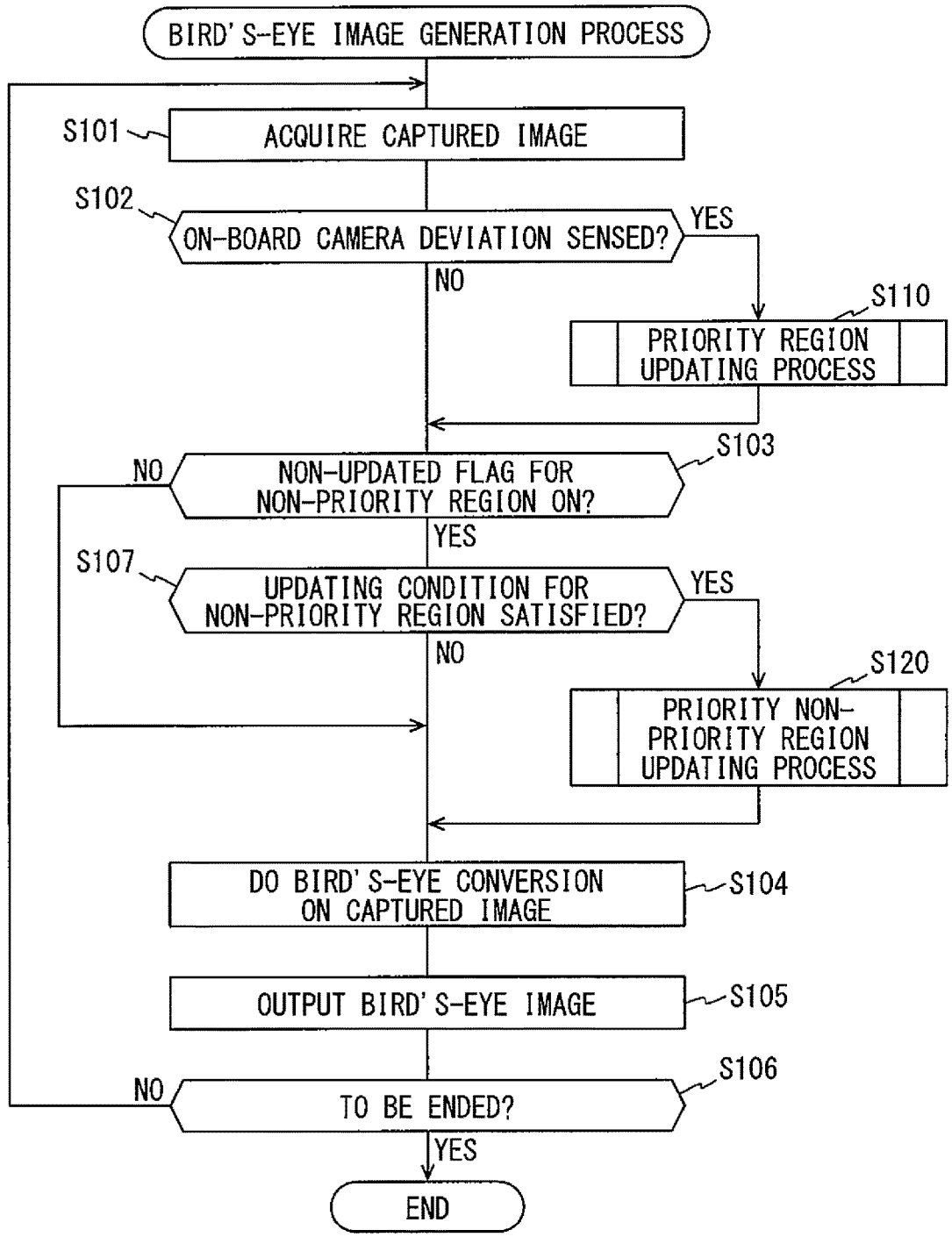
FIG. 4 is a flow chart of a bird's-eye image generation process performed by the image generation device.

A-2. Bird's-Eye Image Generation Process:

FIG. 4 shows a flow chart of the bird's-eye image generation process performed by the image generation device 10 in the present embodiment. The bird's-eye image generation process is a process of generating a bird's-eye image based on the captured image acquired from each of the in-vehicle cameras 2a to 2d and displaying the generated bird's-eye image on the in-vehicle monitor 3. Since each of the in-vehicle cameras 2a to 2d repeats imaging in a predetermined period (e.g., 30 Hz), the bird's-eye image generation process is repeatedly performed in a corresponding period.

When the bird's-eye image generation process is started, first, the captured images are acquired from the in-vehicle cameras 2a to 2d (S101). In the present embodiment, as the captured images, a front-view captured image, a rear-view captured image, a left-view image, and a right-view captured image are acquired. Next, it is determined whether or not deviation of any one of the in-vehicle cameras 2a to 2d is sensed (S102).

Normally, deviation of any of the in-vehicle cameras 2a to 2d is not sensed in S102 and "no" is given as a result of the determination, and subsequently it is determined whether or not a non-updated flag for the non-priority region is set to ON (S103). The non-updated flag for the non-priority region mentioned herein is a flag which shows that the non-priority region in the conversion table has not been updated yet. That is, as described later, when the need arises to update the conversion table, the image generation device 10 in the present embodiment immediately updates the priority region in the conversion table. However, the image generation device 10 updates the non-priority region after the predetermined updating conditions is satisfied. Consequently, when the updating condition is not satisfied, even though, the priority region in the conversion table is updated, the non-priority region remains to be non-updated. The non-updated flag is a flag set so as to show that the non-priority region thus remains to be non-updated. The state where the non-updated flag is set to ON shows the state where the priority region has been updated, but the non-priority region has not been updated yet.

When deviation of any of the in-vehicle cameras 2a to 2d is not sensed as described above (S102: no), the priority region updating process is not performed, so that the non-updated flag for the non-priority region is OFF (S103: no). Accordingly, the acquired captured images are subjected to the bird's-eye conversion (S104). The bird's-eye image conversion is the process of converting the image captured by each of the in-vehicle cameras 2a to 2d to an image (bird's-eye image) which appears as if captured in a direction in which the vehicle 1 is looked down on from above. The front-view captured image, the rear-view captured image, the left-view captured image, and the right-view captured image are each subjected herein to the bird's-eye conversion in accordance with the conversion table and combined with each other to provide one bird's-eye image in which the surroundings of the vehicle 1 are looked down on from immediately above the vehicle 1. Subsequently, the obtained bird's-eye image is output to the in-vehicle monitor 3 (S105).

Then, it is determined whether or not the bird's-eye image generation process is to be ended (S106). When the bird's-eye image generation process is not to be ended (S106: no), the process returns to the beginning thereof where the captured images from the in-vehicle cameras 2a to 2d are acquired (S101). As described above, since each of the in-vehicle cameras 2a to 2d takes an image in the predetermined period (e.g., 30 Hz), it follows that the captured image is also acquired in the same period (e.g., 30 Hz) in S101. The process performed heretofore (S101 to S106) is repeated until the bird's-eye image generation process is ended (S106: yes) by performing the stopping of the display on the in-vehicle monitor 3 or the like.

The description has been given heretofore of the process of generating the bird's-eye image from the captured images and outputting the generated bird's-eye image to the in-vehicle monitor 3 when the mounting position or mounting angle of each of the in-vehicle cameras 2a to 2d does not deviate (S102: no).

However, the mounting position or mounting angle of each of the in-vehicle cameras 2a to 2d may deviate for any reason. When any of the in-vehicle cameras 2a to 2d undergoes deviation, in S102, "yes" is given as a result of the determination. As a method of sensing the presence or absence of deviation of any of the in-vehicle cameras 2a to 2d, various methods can be used appropriately. The image generation device 10 in the present embodiment senses the presence or absence of deviation of any of the in-vehicle cameras 2a to 2d using the following method.

Figure 5:
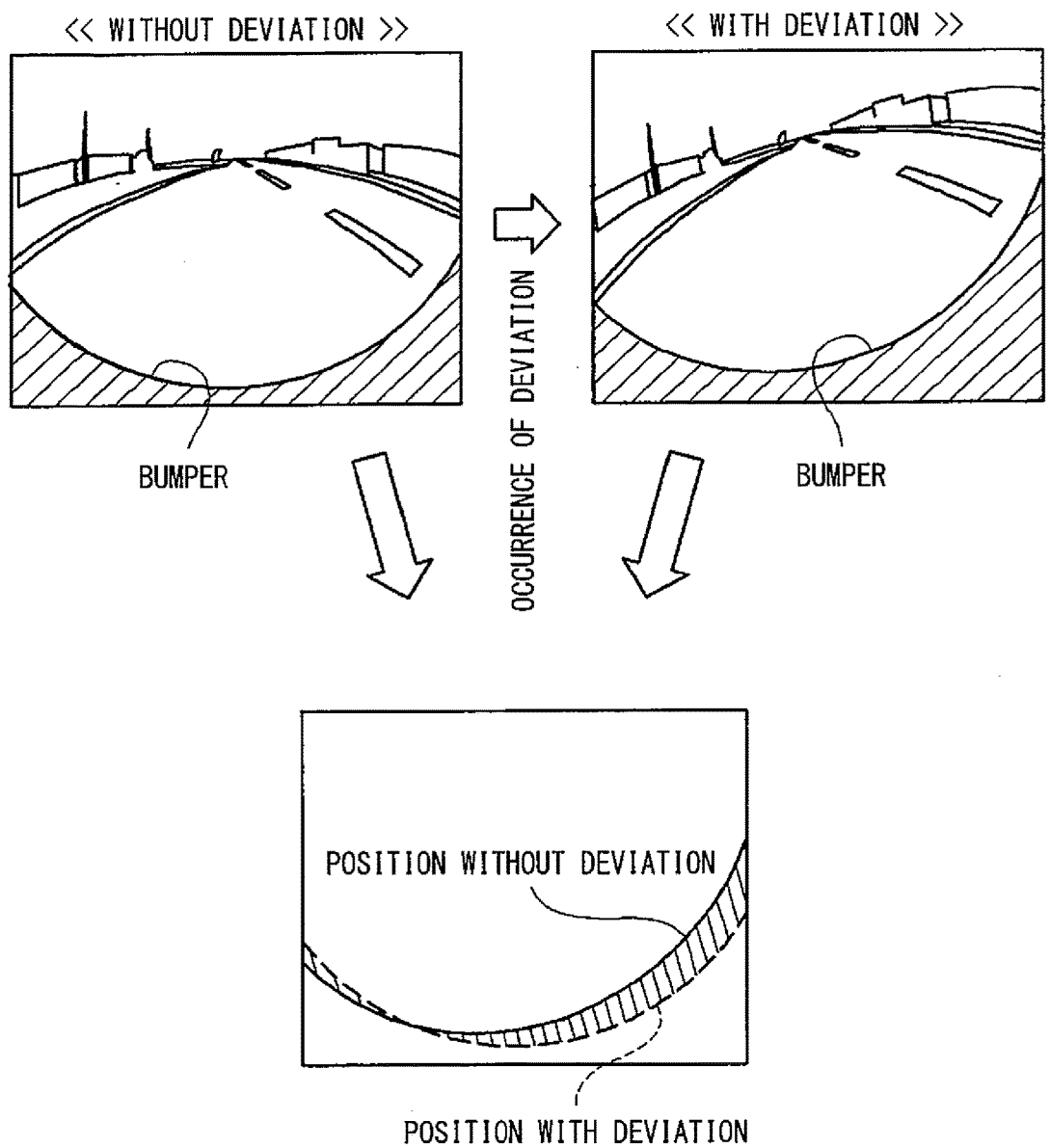
FIG. 5 is an illustration diagram showing a captured image when an in-vehicle camera undergoes deviation.

By way of example, FIG. 5 shows the image (which is the front-view captured image herein) captured by the in-vehicle camera 2a. To each of the in-vehicle cameras 2a to 2d, a wide-angle lens (such as a fish-eye lens) is attached so that, as shown in the drawing, the bumper of the vehicle 1 is seen in the captured image. When the in-vehicle cameras 2a to 2d are mounted at correct positions and at correct angles relative to the vehicle 1, as a matter of course, the bumper seen in the captured image is accordingly at a normal position which is automatically determined. Conversely, when the mounting position or mounting angle of any of the in-vehicles cameras 2a to 2d relative to the vehicle 1 deviates, the position of the bumper seen in the captured image moves from the normal position. Accordingly, the position (normal position) of the bumper seen in the captured image in the state where none of the in-vehicle cameras 2a to 2d has undergone deviation is stored. Then, by detecting the position of the bumper in the image captured later and comparing the detected position to the normal position, it is possible to determine whether or not any of the in-vehicle cameras 2a to 2d has undergone deviation.

In the example shown in FIG. 5, the front-view image captured when the in-vehicle camera 2a has not undergone deviation is shown and the front-view image captured when the in-vehicle camera 2a has undergone deviation is also shown. In the lower part of FIG. 5, the position (shown by the solid line) of the bumper when there is no deviation and the position of the bumper (shown by the broken line) when there is deviation are shown in superimposed relation. Accordingly, the area of the portion in the lower part of FIG. 5 which is hatched with oblique lines corresponds to the amount of movement of the bumper caused by the deviation of the in-vehicle camera 2a. Therefore, in the present embodiment, when the area is not less than a predetermined threshold value, it is determined that the in-vehicle camera 2a has undergone deviation. For each of the other in-vehicle cameras 2b to 2d also, it is possible to similarly sense whether or not there is deviation.

When deviation of any of the in-vehicle cameras is thus sensed (S102: yes), the priority region updating process (S110) is started.

Figure 6:
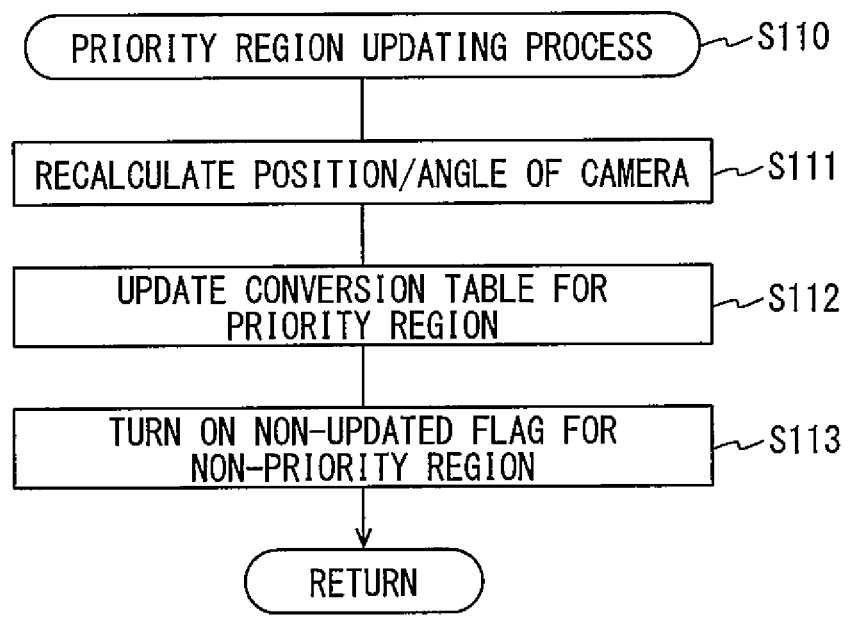
FIG. 6 is a flow chart of a priority region updating process.

FIG. 6 shows a flow chart of the priority region updating process (S110). First, the mounting position and mounting angle of the in-vehicle camera is calculated again (S111). There are various methods for calculating again the mounting position and mounting angle of the in-vehicle camera, and any of the methods may be used. For example, there is a method using the white lines seen in a captured image as indicator objects. When at least one of the mounting position and mounting angle of the in-vehicle camera deviates, left and right white lines that should be detected in parallel with each other along the lane are detected in a hen-toed (or duck-footed) shape in the captured image. In this case, by performing optimization such that the left and right white lines are detected in parallel, the mounting position and mounting angle of the in-vehicle camera can be calculated again. In another example, when the mounting position or mounting angle of any of the in-vehicle cameras deviates, the white lines that should be displayed to coincide with each other in the overlapping region of the areas captured by the two in-vehicle cameras do not coincide with each other. In this case, by performing optimization such that the white lines are displayed to coincide with each other, the mounting position and mounting angle of the in-vehicle camera can be calculated again.

When the mounting position and mounting angle of the in-vehicle camera are calculated again (S111), the conversion table for the priority region is updated (S112). As described above, in the present embodiment, the regions of the conversion table corresponding to predetermined ranges on both left and right sides of the vehicle 1 where the white lines are displayed in the bird's-eye image are assumed to be the priority region (see FIG. 3). The priority region is only a relatively small portion of the conversion table for the entire front captured region. The major portion is the remaining non-priority region. Accordingly, the updating of the conversion table for the priority region can promptly be completed after the mounting position and mounting angle of the in-vehicle camera are calculated again. When the conversion table for the priority region is updated (S112), the non-updated flag for the non-priority region is turned ON (S113), and the image generation device 10 returns to the bird's-eye image generation process in FIG. 4.

In the bird's-eye image generation process after the return, because the non-updated flag for the non-priority region is ON (S103: yes), it is determined whether or not the updating condition for the non-priority region is satisfied (S107).

A description will be given herein of the updating condition (S107) for the conversion table for the non-priority region. In the present embodiment, the updating condition for the non-priority region is set using the travel speed of the vehicle 1 acquired from the vehicle speed sensor 4. For example, the conversion table for the non-priority region may be updated when the vehicle speed is not more than 40 km/h and the conversion table for the non-priority region may not be updated when the vehicle speed is higher than 40 km/h. When the speed of the vehicle 1 increases and a large processing load is placed on the CPU for the generation and outputting of the bird's-eye image, it is possible to assure the processing ability of the CPU by not updating the non-priority region. Note that, in the present embodiment, the updating condition for the non-priority region is set based on the travel speed of the vehicle 1, but the updating condition for the non-priority region is not limited thereto. Another updating condition will be described later.

As a result of determining the updating condition for the non-priority region (S107) as described above, when the updating condition is not satisfied (S107: no), the captured image is subjected to the bird's-eye conversion (S104) in accordance with the current conversion table and the bird's-eye image is output (S105). Since the non-updated flag for the non-priority region is ON (S103: yes), it follows that, every time the bird's-eye image generation process is performed thereafter, a determination of whether or not the updating condition for the non-priority region is satisfied continues to be made (S107). As a result, it is eventually determined that the updating condition for the non-priority region is satisfied (S107: yes) and the non-priority region updating process is started (S120).

Figure 7:
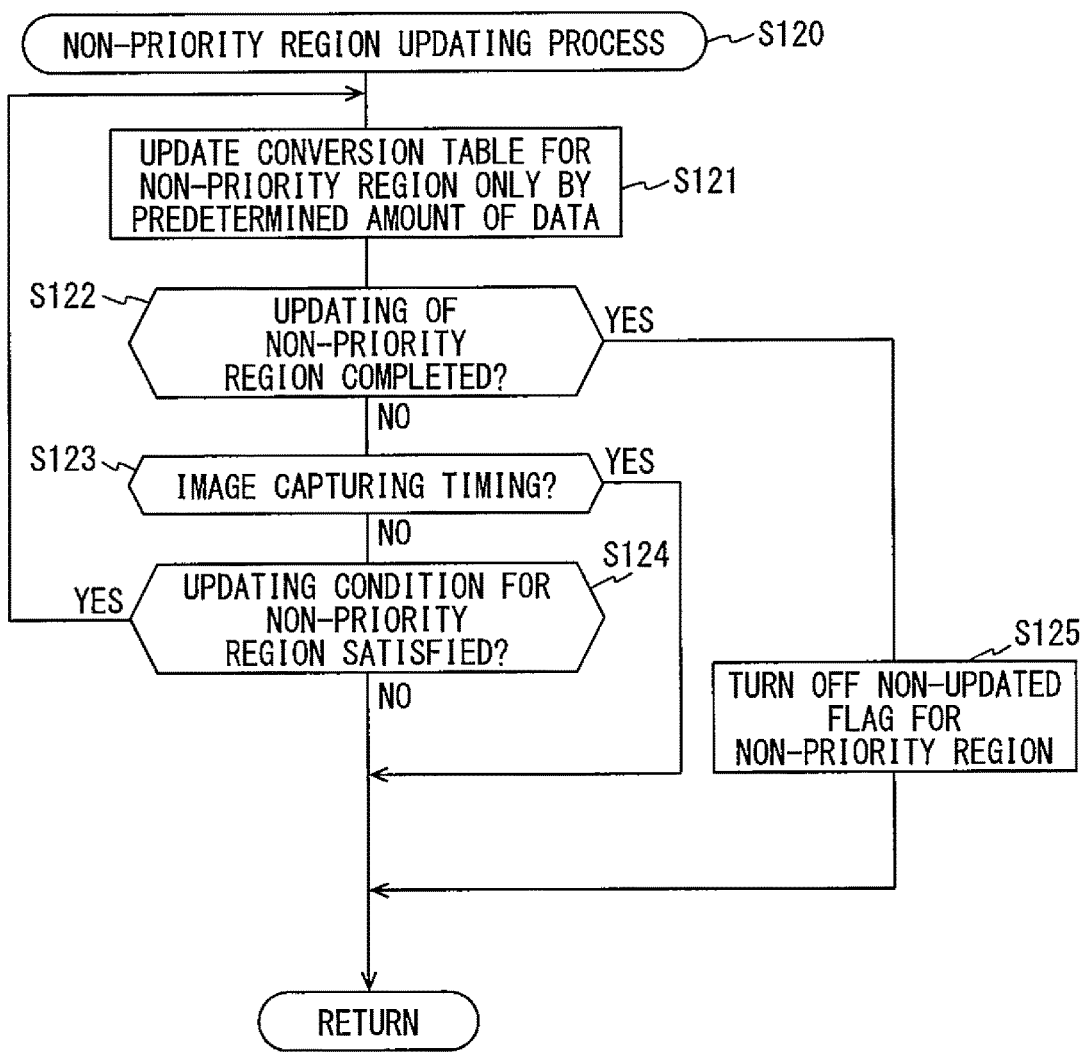
FIG. 7 is a flow chart of a non-priority region updating process.

FIG. 7 shows a flow chart of the non-priority region updating process (120). First, the conversion table for the non-priority region is updated herein only by a predetermined amount of data (S121). As the predetermined amount of data, any suitable number of pixels for the update of the conversion table may be set in advance. When the conversion table for the non-priority region is updated only by the predetermined amount of data, it is checked that the updating of the non-priority region is not completed (S122: no), that photographing timing has not come yet (S123: no), and that the updating condition for the no-priority region is continuously satisfied (S124: yes). When the result of checking each of these three points is satisfactory, the conversion table for the non-priority region is updated again only by the predetermined amount of data (S121). Then, when the result of checking any one of these three points is no longer satisfactory as follows, the image generation device 10 returns to the bird's-eye image generation process in FIG. 4.

When the updating of the non-priority region is completed with regard to the first check point (S122: no), there is no conversion table to be updated left so that the non-updated flag for the non-priority region is turned OFF (S125), and then the image generation device 10 returns to the bird's-eye image generation process in FIG. 4.

When the photographing timing has come with regard to the second check point (S123: yes), the image generation device 10 returns to the bird's-eye image generation process in FIG. 4 to allow the bird's-eye image to be output to the in-vehicle monitor 3 without delay. The photographing timing mentioned herein is the timing of taking the image acquired in the subsequent bird's-eye image generation process. By thus setting a time limit for interrupting the non-priority region updating process, it is possible to be prepared for the acquisition of the next captured image (S101) and output the bird's-eye image to the in-vehicle monitor 3 without delay thereafter. Note that, to more reliably prevent such a delay, the setting may also be such that, in the determination made in S123, the non-priority region updating process is interrupted at the time prior to the photographing timing.

With regard to the third check point, the updating condition (S124) for the non-priority region is the same as the condition included in the determination made in S107 of the bird's-eye image generation process shown in FIG. 4. That is, before the non-priority region updating process (S120) is started, it is checked that the updating condition for the non-priority region is satisfied (S107: yes) and, even while the non-priority region updating process (S120) is performed, it is regularly checked that the updating condition for the non-priority region is satisfied (S124: yes). When the updating condition for the non-priority region is no longer satisfied while the non-priority region updating process (S120) is performed (S124: no), the image generation device 10 returns to the bird's-eye image generation process in FIG. 4 even though the updating of the non-priority region has not been completed yet (S122: no) and the photographing timing has not come yet (S123: no).

When the photographing timing has come with regard to the foregoing second check point (S123: yes) and when the updating condition for the non-priority region is no longer satisfied with regard to the third check point (S124: no), the image generation device 10 returns to the bird's-eye image generation process in FIG. 4, but the updating of the non-priority region has not been completed yet (S122: no). Accordingly, in the subsequent bird's-eye image generation process, it is determined that the non-updated flag for the non-priority region is ON (S103: yes) and it is determined whether or not the updating condition for the non-priority region is satisfied (S107). Then, the non-priority region updating process (S120) is repeatedly performed after it is checked that the updating condition for the non-priority region is satisfied (S107: yes) until the updating of the non-priority region is completed (S122: yes) and the non-updated flag for the non-priority region is turned OFF (S125).

In the case where the mounting of any of the in-vehicle cameras undergoes deviation while the bird's-eye image generation process in FIG. 4 is repeated in accordance with the processing procedure, the priority region updating process in FIG. 6 and the non-priority region updating process in FIG. 7 are performed to update the conversion table. The following will describe the state of the display of the bird's-eye image in the process of updating the conversion table.

Figure 8:
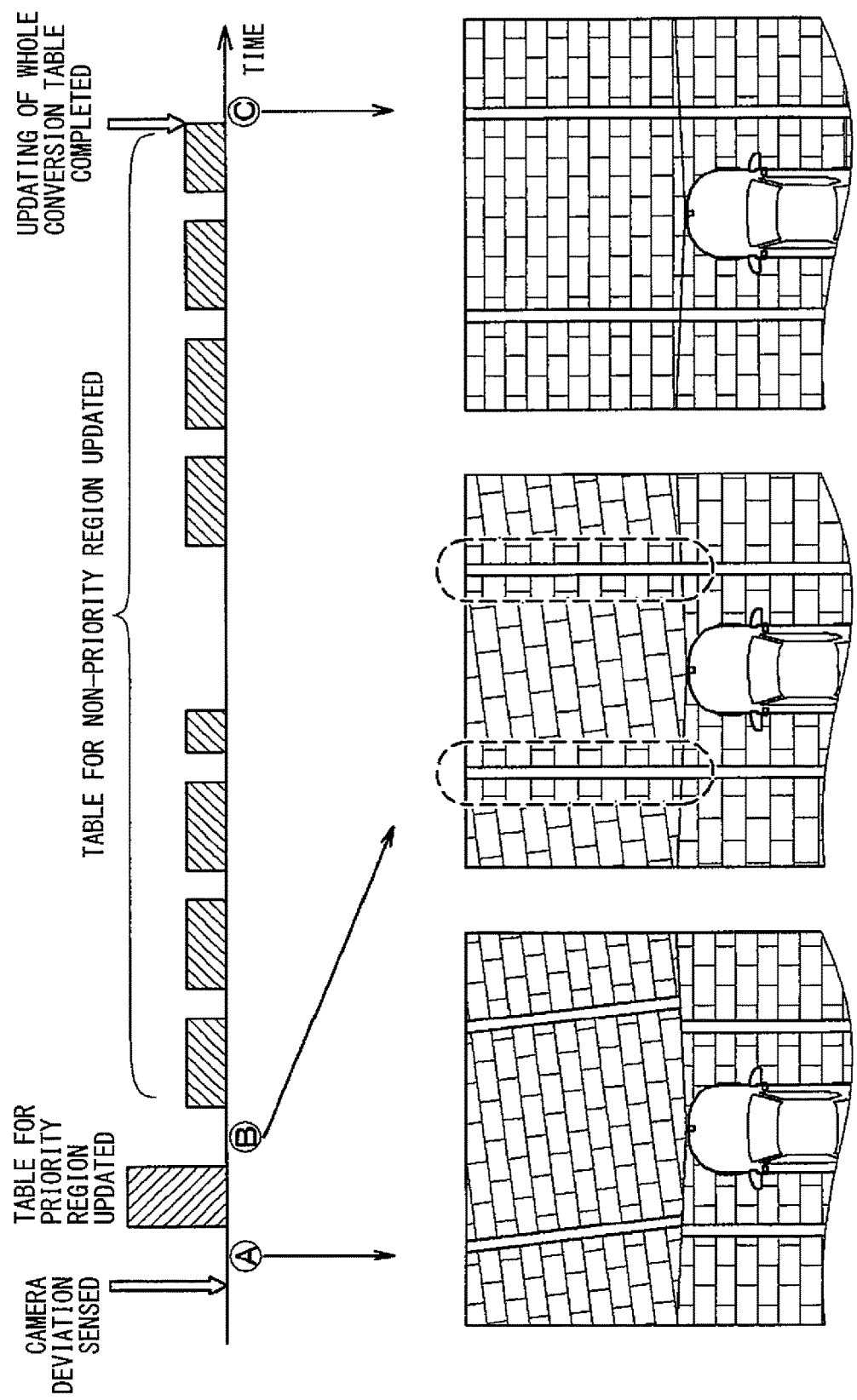
FIG. 8 shows bird's-eye images in accordance with the progress of the updating of the conversion table.

FIG. 8 shows the bird's-eye images when the updating of the conversion table is in progress. In the upper part of FIG. 8, the conversion table updating progress from the sensing of the deviation of the front-view camera 2a to the completion of the updating of the whole conversion table is shown along the rightwardly advancing time axis. As described above, when the deviation of the in-vehicle camera 2a is sensed, the conversion table for the priority region is immediately updated. By way of example, FIG. 8 shows the bird's-eye image at the time A immediately after the sensing of the deviation of the in-vehicle camera 2a and before the updating of the conversion table for the priority region. Note that the road surface in the bird's-eye image illustrated in this drawing apparently has flagstones to allow easy visual recognition of the progress of the updating of the conversion table.

As shown in FIG. 8, in the bird's-eye image at the time A, the white lines and the flagstones are misalignedly displayed at the boundaries between the region captured by the front in-vehicle camera 2a and the regions captured by the left and right in-vehicle cameras 2b and 2c. When the driver views the in-vehicle monitor 3 showing such a bird's-eye image, the driver may notice the misaligned display of the white lines at one view, though whether or not the driver notices the misaligned display of the flagstones depends on how carefully the driver watches the in-vehicle monitor 3. In addition, it is difficult to precisely detect the positions of the white lines on the bird's-eye image from the front captured region where the white lines are misalignedly displayed. As a result, when the vehicle 1 is controlled to keep the lane, the detection of the lane may be affected. Therefore, in accordance with the processing procedure described above, the conversion table for the in-vehicle camera 2a is updated.

As described above, the conversion table for the priority region is updated first. Since the priority region is a region of the conversion table which is smaller than one half of the entire conversion table, the updating of the conversion table for the priority region is completed shortly after the sensing of the deviation of the in-vehicle camera (see upper part of FIG. 8). Then, under the predetermined condition including the vehicle speed or the like described above, the conversion table for the non-priority region is updated. By way of example, FIG. 8 also shows the bird's-eye image at the time B immediately before the updating of the conversion table for the non-priority region is started.

As shown in the regions enclosed by the broken-line portions in the bird's-eye image at the time B in FIG. 8, the priority region is set around each of the white lines on the left and right sides of the vehicle 1. Since the conversion table for the priority region has already been updated, the misaligned display of the white lines seen in the bird's-eye image at the time A is eliminated.

On the other hand, the conversion table for the non-priority region has not been updated yet at this stage so that the majority of the flagstones displayed in the region captured by the front in-vehicle camera 2a are still misaligned. In that regard, the misaligned display of the white lines which is noticeable to the driver is already eliminated and there is no problem in detecting the positions of the white lines. The problem remaining to be solved is the misaligned display of the flagstones, but it can be considered that the misaligned display of the flagstones does not present a serious problem for the following reason. As described above, the road surface shown in FIG. 8 has the flagstones but, actually, most road surfaces are asphalt-paved surfaces. Asphalt pavement provides apparently uniform paved surfaces compared to flagstone pavement. Accordingly, it can be considered that, even when the misaligned display of the road surface still remains in the bird's-eye image at the stage at the time B in FIG. 8, the driver viewing the bird's-eye image will not recognize the misaligned display.

As shown in FIG. 8, when the predetermined condition is satisfied after the conversion table for the priority region is updated, the conversion table for the non-priority region is updated. In the updating of the non-priority region, the updating process is interrupted every time the photographing timing has come as shown in the upper part of FIG. 8 (S123: yes) and is also interrupted when the updating condition for the non-priority region is not satisfied (S124: no). Consequently, for the updating of the conversion table for the non-priority region, a rather long time from after the updating of the conversion table for the priority region (time B in FIG. 8) to the completion of the updating of the whole conversion table (time C in FIG. 8) is required compared to the time required to update the conversion table for the priority region.

As described above, at the time B when the conversion table for the priority region is updated, the misaligned display of the white lines is already eliminated and the misaligned display of a road surface portion which does not include the white lines is unnoticeable. Accordingly, even when some time is required to update the non-priority region, there is no serious problem.

As the updating of the conversion table for the non-priority region proceeds, the misaligned display seen in the non-priority region which is shown at the time B in FIG. 8 is gradually eliminated and the bird's-eye image eventually reaches the state shown at the time C in FIG. 8.

By way of example, FIG. 8 shows the bird's-eye image at the time C when the updating of the non-priority region is completed. When the updating of the conversion table for the non-priority region is completed, it follows that the updating of the whole conversion table is completed. As a result, in the bird's-eye image, the misaligned display of the left and right white lines and the flagstones seen at the boundaries between the front captured region and the left and right captured regions is completely eliminated.

As described above, in the present embodiment, the road surface portion which does not include a road sign such as a white line substantially uniformly appears. Accordingly, by paying attention on the fact that, even when there is some misaligned display in the bird's-eye image, the misaligned display is unnoticeable, the updating of the non-priority region is postponed. Therefore, it is appropriate to set the priority region to the region of the conversion table that is to be referenced to generate the range where misaligned display is noticeable in the bird's-eye image and set the non-priority region to the region of the conversion table that is to be referenced to generate the other range where the misaligned display is unnoticeable. Examples of the range where the misaligned display is noticeable in the bird's-eye image include road signs such as a white line, a pedestrian crosswalk, and a stop line and the like. by setting the regions of the conversion table to be referenced to generate the peripheral ranges on both left and right sides of the vehicle 1 in the bird's-eye image where the white lines are displayed as the priority region, the present embodiment promptly eliminates the misaligned display of the white lines seen on the left and right sides of the vehicle 1 when the deviation of the in-vehicle camera is sensed.

B. First Modification:

In the embodiment described above, it has been described that, when the mounting position or mounting angle of the in-vehicle camera 2a relative to the vehicle 1 deviates, the conversion table is updated. However, the updating of the conversion table is not limited to the case where deviation relative to the vehicle 1 occurs. The conversion table can also be updated even when deviation relative to a road surface occurs. Accordingly, in the present modification, a description will be given of the case where, in response to the deviation of the mounting position and mounting angle of any of the in-vehicle cameras 2a to 2d with reference to the road surface, the conversion table is updated.

Figure 9A:
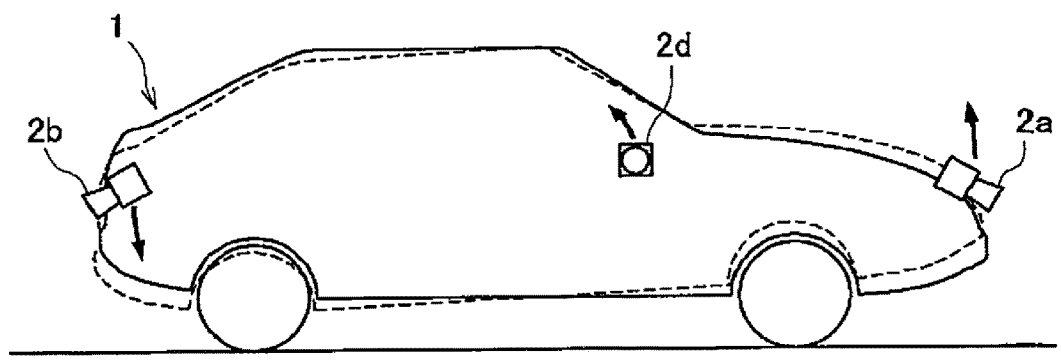
FIG. 9A is an illustration diagram showing that a vehicle 1 in a first modification is backwardly inclined.
Figure 9B:
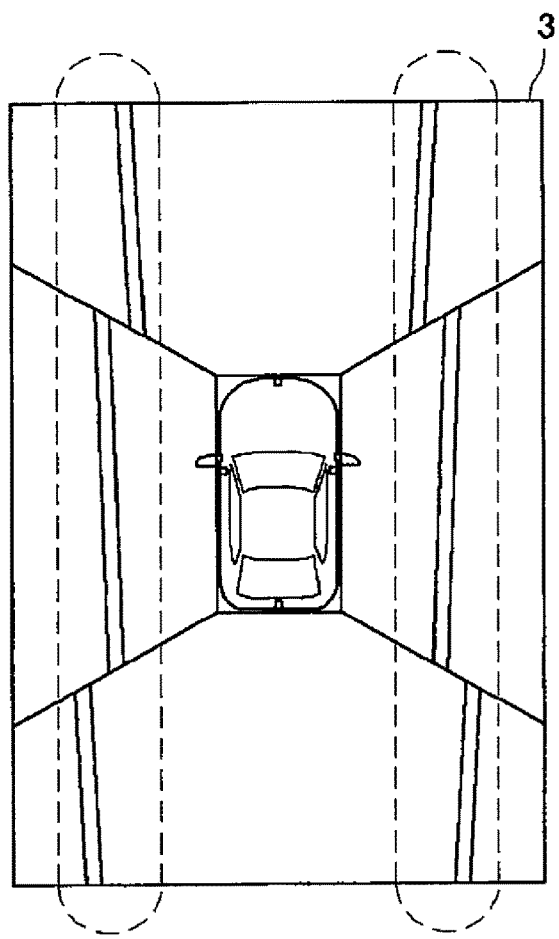
FIG. 9B is a view showing an example of an abnormally displayed bird's-eye image which does not correctly reflect a captured real view.

Each of FIGS. 9A and 9B shows the backwardly inclined vehicle 1. The vehicle 1 shown by the solid line in FIG. 9A is in a normal uninclined state. In this state, when a heavy person takes a rear sheet in the vehicle 1 and the weight balance of the vehicle 1 changes, as shown by the broken-line portion in FIG. 9A, the rear part of the vehicle 1 sinks, while the front part thereof is inclined so as to float. As a result, the in-vehicle cameras 2a to 2d attached to the vehicle 1 move in the respective directions shown by the arrows in FIG. 9A. Consequently, when the vehicle 1 is rearwardly inclined, the mounting position and the mounting angle with reference to the road surface deviate.

Consideration will be given herein to the influence caused by the rearward inclination of the vehicle 1 on the bird's-eye image. In the state where the vehicle 1 is not inclined, the bird's-eye image correctly reflecting the captured real view is generated by referencing the appropriately updated conversion table. For example, when it is assumed that the vehicle 1 is running on the straight lane, in the bird's-eye image obtained at that time, the white lines on both left and right sides of the vehicle 1 are displayed to extend straight in parallel with the direction of travel of the vehicle 1.

However, even though the vehicle 1 is inclined, when the old conversion table updated before the vehicle 1 is inclined is referenced, a bird's-eye image of a view different from the captured real view is undesirably generated. FIG. 9B shows an example of the bird's-eye image which does not correctly reflect the captured real view to result in an abnormal display. Since the white lines which should extend straight along the direction of travel of the vehicle 1 are misalignedly displayed at the boundaries between the regions captured by the in-vehicle cameras 2a to 2d, it can be seen that the captured real view is not correctly reflected. Accordingly, in the present modification also, in the same manner as in the embodiment described above, the conversion table corresponding to the respective regions captured by the in-vehicle cameras 2a to 2d is updated to eliminate the misaligned display of the white lines. In the following description, attention is focused on the point different from that in the embodiment.

As the condition for starting the updating of the conversion table, in the embodiment described above, the sensing of deviation of any of the in-vehicle cameras is determined (S102 in FIG. 4: yes). However, in the present modification, the mounting positions and mounting angles of the in-vehicle cameras 2a to 2d do not deviate relative to the vehicle 1. Accordingly, as described using FIG. 5, deviation of any of the in-vehicle cameras cannot be sensed based on a change in the region including the vehicle 1 (bumper).

Accordingly, in the present modification, when a display of a view different from the captured real view is detected from the bird's-eye image, it is determined that the mounting position and mounting angle of any of the in-vehicle cameras 2a to 2d with reference to a road surface have deviated. In the example shown in FIG. 9B, by detecting the white lines which should be parallel with each other on both left and right sides of the vehicle 1 are not parallel or the left and the white lines which are disconnected in a widthwise direction, it is possible to sense deviation of any of the in-vehicle cameras 2a to 2d with reference to a road surface.

It may also be possible to sense deviation of any of the in-vehicle cameras 2a to 2d using a height sensor instead of sensing the abnormality in the bird's-eye image. Note that the inclination of the vehicle 1 as shown in FIG. 9A is not limited to the case where the vehicle continues to be inclined for a given period of time due to a change in the weight balance of pay load or the like. There may also be a case where the vehicle 1 is inclined only for a short period of time due to a load change resulting from the acceleration/deceleration of the vehicle 1, a course change thereof, or the like. Accordingly, when the vehicle 1 is inclined only for an extremely short period of time, the conversion table may not be updated.

When consideration is given to the range of the conversion table to be updated, in the embodiment described above, the portion of the conversion table to be updated is limited to the portion corresponding to the region captured by the in-vehicle camera 2a in view of the deviation of the in-vehicle camera 2a. In the present modification, as described above using FIGS. 9A and 9B, since the vehicle 1 is inclined, the conversion table is updated for each of the regions captured by the in-vehicle cameras 2a to 2d. In this case also, based on the same considerations as given when any of the in-vehicle cameras 2a to 2d has undergone deviation, the priority region can be set independently for each of the regions captured by the in-vehicle cameras. However, this setting of the priority region is not limiting. The priority region may also be set as follows.

The priority region in the present modification may not be set to the individual regions captured by the in-vehicle cameras 2a to 2d but may be set integrally to the entire bird's-eye image displayed on the in-vehicle monitor 3. In FIG. 9B, as shown by the two regions enclosed by the broken line portions on the left and right sides of the vehicle 1, the priority regions are set to extend in the front-rear direction of the vehicle 1 throughout the whole bird's-eye image irrespective of the regions captured by the in-vehicle cameras 2a to 2d. This prevents the updating of the conversion table in progress from being interrupted at the boundaries between the captured regions and allows the misaligned display of the white lines to be more promptly eliminated.

In the present modification, the prior region may also be set as follows.

As is obviously seen from FIG. 9B, the priority region includes the two closed regions. Without distinguishing these regions from each other, the conversion table may be updated, but either one of the two priority regions may be regarded as the top-priority region and the conversion table therefor may be updated. Then, the conversion table for the priority region on the right side of the vehicle 1 is updated and subsequently the conversion table for the other non-priority region is updated under the same predetermined condition as used in the embodiment described above.

On the left side of the vehicle 1, the position of the white line can more promptly be detected precisely, which is advantageous when drive assist control such as lane keeping control is performed in the vehicle 1.

C. Second Modification:

In the embodiment described above, it is assumed that the priority region is set in advance in the peripheral regions on the left and right sides of the vehicle 1 where the white lines are easily detected. In the present modification, a description will be given of changing the set priority region as needed.

As described above using FIG. 4, in the bird's-eye image generation process in the embodiment, when it is determined that deviation of any of the in-vehicle cameras is sensed (S102: yes), the priority region updating process (S110) is subsequently performed. By contrast, in the present modification, when it is determined that deviation of any of the in-vehicle cameras is sensed (S102: yes), a process as shown in FIG. 10 is performed.

Figure 10:
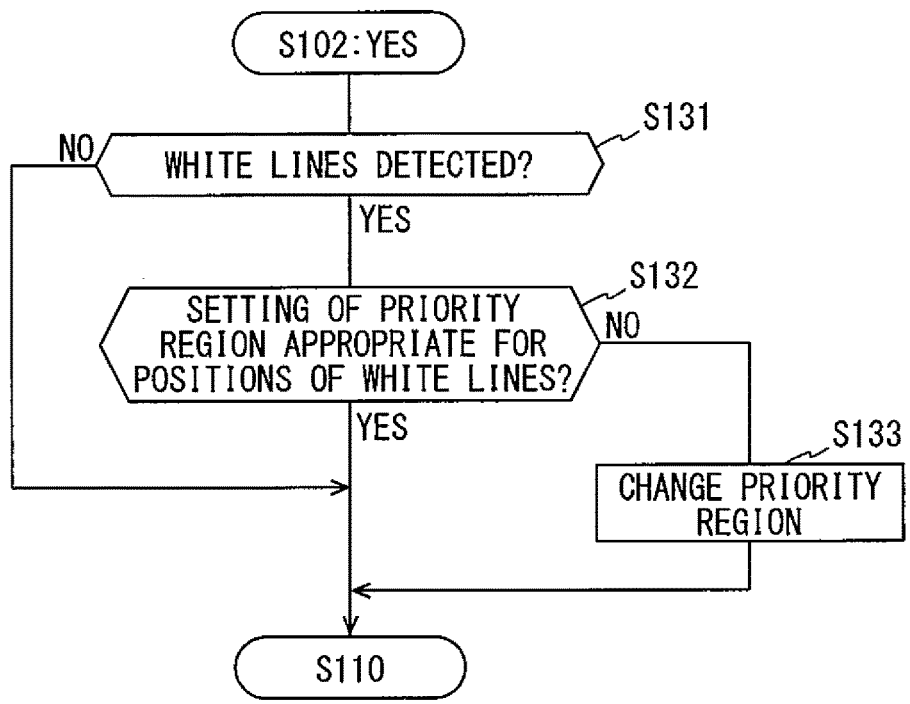
FIG. 10 is a flow chart of a process for changing a priority region in a second modification.

FIG. 10 shows a flow chart of a process for changing the priority region. First, it is determined whether or not the white lines are detected (S131). The white lines may be detected from the captured image acquired in S101 in the bird's-eye image generation process currently performed or the bird's-eye image generated in S104 in the previous bird's-eye image generation process.

When the white lines are not detected (S131: no), in the same manner as in the embodiment described above, the priority region updating process (S110) in FIG. 6 is started.

On the other hand, when the white lines are detected (S131: yes), it is determined whether or not the setting of the priority region is appropriate for the positions of the detected white lines (S132) and, when necessary, the set priority region is then changed (S133). A description will be given thereof using FIGS. 11A and 11B.

Figure 11A:
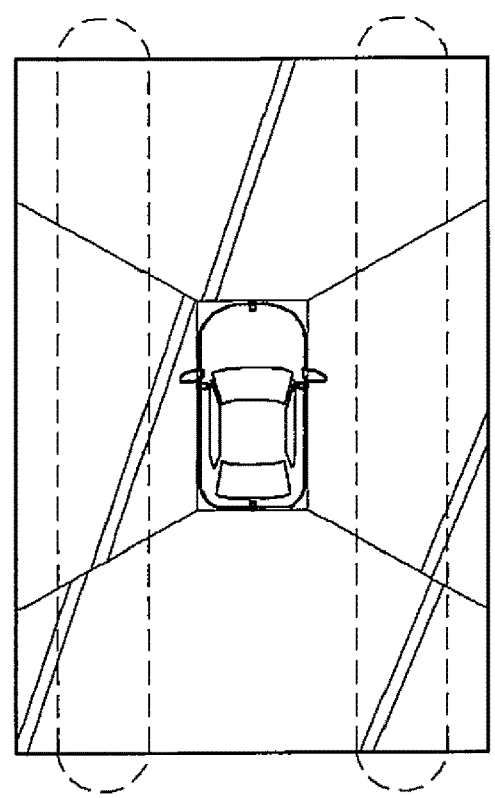
FIG. 11A is an illustration diagram showing a vehicle traversing white lines.
Figure 11B:
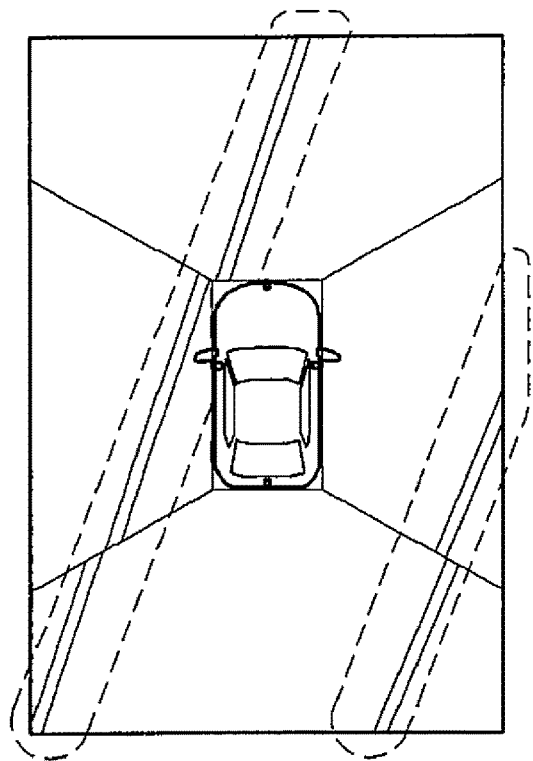
FIG. 11B is an illustration diagram showing the changing of the priority region.

FIGS. 11A and 11B show the changing of the priority region. The vehicle 1 does not always travel along the white lines and may traverse the white lines when, e.g., changing the course, as shown in the drawings. At this time, when the priority regions (regions enclosed by the broken lines in FIG. 11A) are provided on the left and right sides of the vehicle 1 in the same manner as in the embodiment described above, the priority regions are not at positions corresponding to the ranges in which the white lines are displayed. Accordingly, the update of the conversion table for the priority region cannot eliminate the misaligned display of the white lines. In such a case, it is determined that the setting of the priority regions for the positions of the detected white lines is not appropriate (S132: no).

Accordingly, as shown in FIG. 11B, the setting of the priority regions is changed, so that the detected white lines are included in the priority regions (S133). When the conversion table is updated, the misaligned display of the white lines can more reliably be eliminated.

The changing of the setting of the priority regions is not limited to the above described manner of changing of the positions, and the sizes of the regions may also be changed. For example, when the travel speed of the vehicle 1 is high, the positions where the white lines are displayed in the bird's-eye image are likely to frequently move. At such a time, by setting the priority regions larger, the white lines are likely to be more reliably included in the priority region.

Conversely, it may also be possible to set the priority region small when the travel speed of the vehicle 1 is high and set the priority regions larger as the travel speed decreases. These are the settings made in consideration that, as the travel speed of the vehicle 1 is higher, the CPU is required to have the larger processing ability to generate or display the bird's-eye image.

The description has been given heretofore of the case where the priority regions are set to correspond to the peripheral ranges in the bird's-eye image where the white lines are displayed. However, the set priority regions are not limited to the peripheral ranges where the white lines are displayed. For example, as described above in the embodiment, the priority regions can be set based on all the road signs such as a pedestrian crosswalk and a stop line in addition to a white line. When the vehicle 1 is traveling, the position of a road sign such as a pedestrian crosswalk or stop line displayed in the bird's-eye image is not fixed but changes with time. Accordingly, as in the present modification, the priority regions may be set appropriately on each updating of the conversion table. This allows the priority regions to be more reliably set in accordance with surroundings of the road sign whose position displayed in the bird's-eye image changes with time.

The priority region can be set not only based on a road sign, but also in accordance with a peripheral range where an intended monitor object such as a vehicle, a pedestrian, or an obstacle is displayed in the bird's-eye image. For example, when a preceding vehicle is detected in the bird's-eye image for performing a drive assisting function such as avoiding a crash or following a the preceding vehicle, the setting of the priority region in accordance with the preceding vehicle displayed range more prompt restores the preceding vehicle detection accuracy when the conversion table is updated. The image generation device 10 which performs S131 to S133 corresponds to an example of a first region changing unit D. Third Modification:

A description will be given herein of a modification of the updating condition for the non-priority region. in the above described embodiment, the updating condition for the non-priority region (S107 in the process in FIG. 4) is such that, in terms of securing the CPU processing resource, when the travel speed of the vehicle 1 is higher than 40 km/h, the conversion table for the non-priority region is not updated. However, this updating condition for the non-priority region is not limiting.

The use rate of the CPU of the image generation device 10 executing a program may be monitored, inclusive of the processing time during which the CPU is occupied for the execution of other application programs. When the use rate of the CPU is higher than a predetermined value, the conversion table for the non-priority region may not be updated.

Alternatively, the conversion table for the non-priority region may be updated when the vehicle speed is not more than 10 km/h. The conversion table for the non-priority region may not be updated when the vehicle speed is higher than 10 km/h. As described above using FIG. 8, the misaligned display occurring in the non-priority region is not noticeable. However, when the speed of the vehicle 1 is remarkably low, the possibility that the driver watches the in-vehicle monitor 3 for parking is rather high. In addition, since the display positions of the white lines (lines defining a parking location) significantly change during parking, it is necessary to promptly update the conversion table for the entire bird's-eye image.

When the transmission of the vehicle 1 is in an R position, the conversion table for the non-priority region may be updated because the possibility that the driver watches the in-vehicle monitor 3 for parking is rather high.

In a situation where the white lines are not displayed in the non-priority region and only the asphalt-paved surface is displayed, the need to urgently update the conversion table for the non-priority region is small. Accordingly, when the white lines on both left and right sides of the vehicle 1 have continued to be detected for a predetermined time or when the vehicle 1 is travelling straight according to information such as a steering angle, the update of the conversion table for the non-priority region may not be performed.

When the vehicle 1 is traveling an expressway, substantially only an asphalt-paved road surface may be uniformly displayed in the non-priority region based according to similar considerations. Accordingly, when it is determined based on GPS information or the like that the vehicle 1 is travelling a road exclusively for motor vehicles such as an expressway, the update of the conversion table for the non-priority region may not be performed.

The updating conditions described above are combinable to make a comprehensive determination.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An image generation device applied to a vehicle mounted with an in-vehicle camera to line-of-sight-convert an image captured by the in-vehicle camera to generate a line-of-sight-converted image which is an image different in photographing direction from the image captured by the in-vehicle camera, the image generation device comprising:
   a correspondence relationship storage unit that stores a correspondence relationship which is determined in accordance with a mounting position and a mounting angle of the in-vehicle camera with reference to a road surface and which associates a pixel position on the line-of-sight-converted image with a pixel position on the captured image;
   an image generation unit that references the correspondence relationship to generate the line-of-sight-converted image from the captured image;
   a deviation sensing unit that senses deviation of at least one of the mounting position and the mounting angle of the in-vehicle camera;
   a mounted state calculation unit that, upon sensing of the deviation, calculates a new mounting position and a new mounting angle of which the deviation is not sensed;
   a first region updating unit that, upon calculating the new mounting position and the new mounting angle, updates the correspondence relationship associated with a first region in accordance with the new mounting position and the new mounting angle, wherein the first region is a predetermined image region that is set in the line-of-sight-converted image; and
   a second region updating unit that, upon satisfaction of a predetermined updating condition after updating the correspondence relationship associated with the first region, updates the correspondence relationship associated with a second region in the line-of-sight-converted image in accordance with the new mounting position and the new mounting angle, wherein the second region is other than the first region,
   wherein the line-of-sight-converted image is generated based on the updated correspondence relationship and the generated line-of-sight-converted image is displayed on an in-vehicle monitor.

2. The image generation device according to claim 1, wherein
   the updating condition is a condition that the correspondence relationship associated with the second region is to be updated when a travel speed of the vehicle is greater than or equal to a predetermined value.

3. The image generation device according to claim 1, wherein the first region is set in a peripheral range in the line-of-sight-converted image where the peripheral range displays an intended monitor object.

4. The image generation device according to claim 1, wherein
the first region is set in a peripheral range in the line-of-sight-converted image where the peripheral range displays a road sign.

5. The image generation device according to claim 1, further comprising:
a first region changing unit that changes setting of the first region, so that the first region covers an intended monitor object.

6. The image generation device according to claim 1, wherein
the correspondence relationship storage unit stores the correspondence relationship as a conversion table.

7. An image generation method applied to a vehicle mounted with an in-vehicle camera to line-of-sight-convert an image captured by the in-vehicle camera to generate a line-of-sight-converted image which is an image different in photographing direction from the image captured by the in-vehicle camera, the image generation method comprising:
generating the line-of-sight-converted image thorough referencing a correspondence relationship which is determined in accordance with a mounting position and a mounting angle of the in-vehicle camera with reference to a road surface and which associates a pixel position on the line-of-sight-converted image with a pixel position on the captured image;
sensing deviation of at least one of the mounting position and the mounting angle of the in-vehicle camera;
upon sensing of the deviation, calculating a new mounting position and a new mounting angle the deviation of which is not sensed;
upon calculating the new mounting position and the new mounting angle, updating the correspondence relationship associated with a first region in accordance with the new mounting position and the new mounting angle, wherein the first region is a predetermined image region that is set in the line-of-sight-converted image; and
upon satisfaction of a predetermined updating condition after updating the correspondence relationship associated with the first region, updating the correspondence relationship associated with a second region in the line-of-sight-converted image in accordance with the new mounting position and the new mounting angle, wherein the second region is other than the first region,
wherein the line-of-sight-converted image is generated based on the updated correspondence relationship and the generated line-of-sight-converted image is displayed on an in-vehicle monitor.

* * * * *